J. N. FORRESTER.
Car Seat and Couch.
No. 21,251. Patented Aug. 24, 1858.
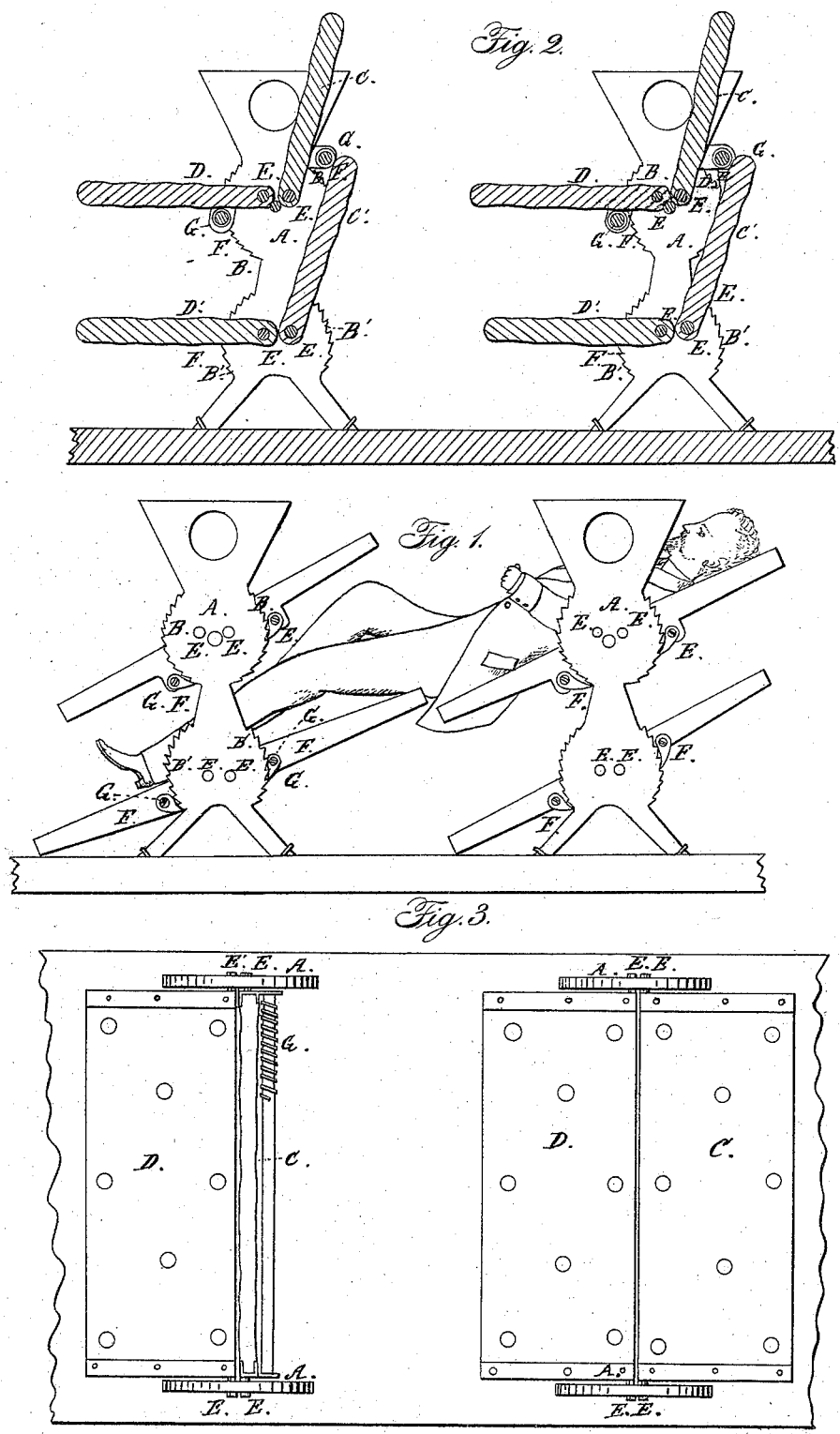

UNITED STATES PATENT OFFICE.

J. N. FORRESTER, OF FAIRFAX COURT-HOUSE, VIRGINIA.

CAR SEAT AND COUCH.

Specification of Letters Patent No. 21,251, dated August 24, 1858.

*To all whom it may concern:*

Be it known that I, J. N. FORRESTER, of Fairfax Court-House, in the county of Fairfax and State of Virginia, have invented a new and useful Improvement in Sleeping-Car Seats; and I do hereby declare that the following is a full, clear, and exact description of the same, reference being had to the accompanying drawings, forming a part of this specification, in which—

Figure 1, is a side view of a car seat constructed after my invention. Fig. 2, is a vertical longitudinal section of the same. Fig. 3, is a plan or top view of the same.

Similar letters of reference, in each of the several figures indicate corresponding parts.

The nature of my invention consists in combining with car seats which have an adjustable bottom and back, an auxiliary back and bottom which are adjustable, said auxiliary back and bottom being arranged below the bottom and back of the main seat. By this arrangement each of the main seats answers well for day use, and at night can be extended on an incline plane and thus serve as comfortable sleeping couches.

My invention also consists in providing ratchet teeth on the front and back edges of the frame of the seat in combination with spring pawls attached to the back and bottom of the seat; whereby the back and bottom can be adjusted very speedily and retained in whatever position they may be adjusted.

To enable others, skilled in the art, to make and use my invention, I will proceed to describe its construction and operation.

A, A, represent the sides of the seat; B, B', ratchet teeth formed on the back and front edges of the same; C, the back and D, the bottom of the main seat and C', D', the back and bottom of the auxiliary seat. The back and bottom of both seats are hinged to the frame at E, E', so that they may be adjusted from the chair form shown in Fig. 2, to the couch form shown in Fig. 1.

F, F, F', F', are pawls attached to spring turning rods G, G, of the back and bottom of the seat. These pawls take into the ratchet teeth B, B', of the frame and hold the seat and back to whatever position they may be adjusted. By lifting the pawls out of the ratchet teeth the back and seat can be lowered to the inclined position shown in Fig. 1 and by allowing the pawls to spring again into the teeth the seat and back will be held in said position.

It will be seen that the rear edge of the back of the auxiliary seat lies slightly above the front edge of the bottom of the main seat and thereby a stop, to prevent the person who may be reclining on the couch, as illustrated in red, from slipping down, by reason of being jolted by the motion of the cars, is formed. It will also be seen, Fig. 2, that the back and bottom of the auxiliary seat occupy positions out of the way when the main seat is used for day sitting.

This arrangement of car seat is very simple and compact and can be applied to cars already in use at a small cost. It is also easily managed at night when it is desirable to convert it into a sleeping couch.

What I claim as my invention and desire to secure by Letters Patent, is—

1. Combining with car seats D, C, an auxiliary back and bottom which are adjustable, said auxiliary back and bottom C' D' being arranged and operating substantially as and for the purposes set forth.

2. The ratchet teeth B, B', and spring pawls F, F, combined and arranged in the manner and for the purposes set forth.

The above specification of my improvement in car seats is hereby signed by me this 29th day of July, 1858.

J. N. FORRESTER.

Witnesses:
 G. YORKE AT LEE,
 EDW. F. BROWN.